United States Patent Office 3,066,173
Patented Nov. 27, 1962

1

3,066,173
PREPARATION OF NITROCYCLOHEXANE
Yoonsik Lee, Terre Haute, Ind., assignor to Commercial Solvents Corporation, New York County, N.Y., a corporation of Maryland
No Drawing. Filed July 6, 1961, Ser. No. 122,096
3 Claims. (Cl. 260—644)

My invention relates to an improved process for the preparation of nitrocyclohexane. More particularly, my invention relates to an improved process for the preparation of nitrocyclohexane by the nitration of cyclohexane with nitric acid.

Nitrocyclohexane, an important intermediate in the production of the polyamide caprolactam, has been successfully produced by nitration by cyclohexane with nitric acid according to the process described in U.S. Patent 2,343,534 to Robert M. Cavanaugh and Wesley Nagle. This process involves mainly reacting cyclohexane and nitric acid at temperatures ranging from about 100 to 200° C. at pressures ranging from about 30 to about 150 pounds utilizing mole ratios of cyclohexane to nitric acid of 3:0.75 to 1:2 while maintaining a nitric acid concentration of about 30 to about 90%. According to the process of the patent, the nitration is carried out utilizing a reaction time of upwards from two hours.

While the above-described process readily produces nitrocyclohexane in reasonably satisfactory yields, many drawbacks exist which limit its usefulness on an industrial basis. First of all, the reaction time is long and requires large and cumbersome equipment in order to produce the product in large amounts. Secondly, but more important, is the fact that exceedingly large amounts of by-product adipic acid, often as large as 30–40%, are produced along with nitrocyclohexane thus not permitting proper utilization of cyclohexane for nitrocyclohexane production. Also, the yields of nitrocyclohexane are only reasonably satisfactory for large-scale industrial operations.

I have now discovered an improved process for producing nitrocyclohexane by the nitration of cyclohexane with nitric acid. My process not only allows the production of nitrocyclohexane in greatly improved yields, but materially shortens the reaction time. But more importantly, by the utilization of my improved process, the amounts of adipic acid produced are greatly reduced.

My process generally consists of conducting the nitration reaction at pressures ranging from about 1,000–4,000 p.s.i. for a period not to exceed six minutes. Surprisingly, I have found that when these conditions in the nitration of cyclohexane with nitric acid are coupled with temperatures of from about 100 to 200° C., a mole ratio of cyclohexane to nitric acid from about 3:0.75 to 1:2 with

2 the utilization of nitric acid having a concentration of from about 20 to about 90% yields as high as 75% of nitrocyclohexane are obtained while yields of adipic acid are reduced many times to a level of only 1 to 10%.

In carrying out my process, I have found it generally preferable for maximum results to utilize pressures ranging from about 1,500 to 3,500 p.s.i. While reaction time should not exceed six minutes, it is generally necessary to carry out the reaction for at least two minutes in order to obtain maximum yields of nitrocyclohexane with minimum production of adipic acid.

The following examples serve to illustrate my invention, but I do not intend to be limited to the particular amounts, procedures, or conditions set forth therein.

*Example I*

252 grams of cyclohexane and 150 grams of 35% aqueous nitric acid were passed through a coiled reactor in a four-minute period. During the four-minute period, the reactor was maintained at a pressure of about 3,100 p.s.i. and the temperature was maintained at between 160–170° C. Examination of the products from the reaction show them to comprise 249.3 grams of nitrocyclohexane and 29.5 grams of adipic acid corresponding to theory yield based on cyclohexane of 64.5% ntirocyclohexane and 8.2% adipic acid.

*Example II*

504 grams of cyclohexane and 450 grams of 30% aqueous nitric acid were passed through a coiled reactor in a six-minute period. During the six-minute period, the reactor was maintained at a pressure of about 3,100 p.s.i. and the temperature was maintained at between 160–170° C. Examination of the products of the reaction show them to comprise 494.6 grams nitrocyclohexane and 87.6 grams adipic acid corresponding to theory yields based on cyclohexane of 63.9% nitrocyclohexane and 10.0% adipic acid.

Now having described my invention, what I claim is:

1. In a process for the production of nitrocyclohexane by the reaction of aqueous nitric acid having a concentration ranging from about 20 to about 90% and cyclohexane at temperatures ranging from about 100 to about 200° C., the improvement which comprises carrying out the reaction at pressures ranging from about 1,000 to about 4,000 p.s.i. for a period not to exceed six minutes.

2. The process of claim 1 wherein the pressure ranges from about 1,500 to about 3,500 p.s.i.

3. The process of claim 1 wherein the reaction period ranges from about two to about six minutes.

No references cited.